Patented Oct. 10, 1950

2,525,621

UNITED STATES PATENT OFFICE 2,525,621

PROCESS FOR THE PREPARATION OF AROMATIC ORTHODINITRILES

Mario Scalera and Robert E. Brouillard, Somerville, N. J., assignors to American Cyanamid Company, New York, N. Y., a corporation of Maine No Drawing. Application August 8, 1946,
Serial No. 689,182

12 Claims. (Cl. 260—465)

This invention relates to a process for the preparation of orthodinitriles from ortho dicarboxylic acids and their anhydrides.

Aromatic ortho dinitriles, particularly phthalonitrile and its derivatives, have achieved a large scale technical use in the production of phthalocyanine pigments. While a number of processes for the production of the ortho dinitriles have been proposed, the one commonly used involves the catalytic vapor phase reaction of the dicarboxylic anhydride or imide with ammonia. This process is effective if carefully controlled and used on a large scale, but requires expensive and elaborate equipment and is usable only with anhydrides or imides which can be readily volatilized without decomposition. There has therefore been a considerable need for noncatalytic processes, of which several have been proposed. Phthalamides have been dehydrated in solution in a tertiary base by means of phosgene or halogen compounds of phosphorus and sulfur. The diammonium salts have likewise been dehydrated under similar conditions. These processes have not been practical for large scale operation because of the cost of the starting materials and the number of steps in the process. For example, diammonium salts must be isolated from aqueous solution and dried, which is a difficult process, as the salts tend to lose ammonia on heating. The diamides are also expensive because their production requires a number of complicated steps involving the conversion of the dicarboxylic acid to its imide under anhydrous conditions, isolation of the imide, reaction with excess aqueous ammonia to form a diamide, and isolation and drying.

The present invention avoids the disadvantages encountered with the liquid phase reactions which have been used hitherto. The only raw material which is necessary is the anhydride of the acid which is transformed into the ammonium salt of its monoamide by treatment with gaseous ammonia in a reaction medium consisting of liquid aromatic tertiary nitrogen base, and the reaction mixture is then dehydrated with phosphorus oxychloride without requiring the removal of the solvent. The process is simple to operate and gives excellent yields of the desired dinitriles.

The dehydration proceeds readily at very moderately elevated temperatures, preferably from 70–100° C. No difficulty is encountered and excellent yields are obtained. The product is isolated by drowning in water, acidifying to dissolve the organic base, and filtration. It is an advantage of the present invention that further purification is seldom necessary.

The process of the present invention is not only useful in the production of volatilizable dinitriles, such as phthalonitrile, but is particularly useful to produce nitriles which cannot be volatilized without decomposition, such as 2,3-dicyano anthraquinone which is a new chemical component.

The present process involves but a single medium and might be called a one step process for the production of dinitriles from the corresponding anhydrides. The reaction, of course, proceeds in stages, but it is not necessary to isolate the intermediates produced. The same reaction mixture is used and the step of isolating the intermediate ammonium salt is avoided.

The two stages of the reaction both present advantages. The first stage, namely, the production of the ammonium salt of the monoamide, represents an important practical improvement over the procedures hitherto used to produce such compounds which have involved various inert solvents, such as benzene or alcohol. When it is attempted to produce the ammonium salt of phthalamic acid in benzene or alcohol it is necessary to pass ammonia gas through the solution for many hours and then to stir for a long period of time, or else operate under superatmospheric pressure. Alcohol presents the further disadvantage that elevated temperatures are required. The first stage of the present process, on the contrary, operates readily, the reaction of the acid anhydride with ammonia being almost instantaneous, and the production rate being limited only by the rate at which ammonia can be conveniently introduced. Losses of ammonia and solvent are therefore kept to a minimum. The reason why the reaction proceeds with such extraordinary speed in a tertiary organic base as compared to the rate in hydrocarbons and alcohols is not known, and it is not intended to limit the present invention to any theory of action as far as the first stage is concerned.

The second stage of the present process also presents advantages. No isolation is necessary if the preferred modification is used, and excellent yields of the dinitrile are obtained, which can be recovered in a pure form by simple drowning, acidification and filtration, thus eliminating costly steps of isolation, separation of different solvents, drying, and the like. It is not known why the ammonium salt of the monoamide dehydrates so readily at such moderate temperatures with the production of so pure a dinitrile. We believe that the absence of decomposition during reaction with evolution of ammonia may be an important factor. Apparently, in the reaction decomposition is absent or negligible.

It is an advantage of the present invention that the particular aromatic tertiary nitrogen base is not critical. The common liquid tertiary nitrogen heterocycles may be used, such as pyridine and its homologues, quinoline and its simple derivatives, etc. Other tertiary amines such as dimethylaniline, diethylaniline, dimethyltoluidines, and the like may also be used. Another advantage of the invention is that the tertiary nitrogenous base does not have to be chemically pure. Thus, technical mixtures of tar bases which may contain many different liquid heterocycles are usable and give substantially the same results as a pure single base. Among the typical aromatic ortho dicarboxylic acid anhydrides which may be transformed into their dinitriles by the process of the present invention are phthalic anhydride, 3-nitrophthalic anhydride, 4-nitrophthalic anhydride, 3-chlorophthalic anhydride, 4-chlorophthalic anhydride, 4,5-dichlorophthalic anhydride, tetrachlorophthalic anhydride, napthalene-o-dicarboxylic anhydrides, such as the 1,2-dicarboxylic anhydrides, anthraquinone-o-dicarboxylic acid anhydrides, heterocyclic orthodicarboxylic acid anhydrides such as quinolinic anhydride.

The amount of phosphorus oxychloride used for dehydration is not critical. It is of course necessary to use a sufficient amount to react with all of the water given off in the reaction. A small excess does no harm, but a large excess simply wastes material and is therefore undesirable.

The invention will be described in greater detail in conjunction with the following specific examples. The parts are by weight.

*Example 1*

148 parts of phthalic anhydride are dissolved in 750 parts of pyridine in a closed apparatus. 34.7 parts of anhydrous ammonia gas are then introduced into the solution at such a rate that a positive pressure is maintained after the air has been displaced. During the addition the temperature of the mixture rises to about 35° C. and ammonium phthalamate begins to precipitate as a white crystalline solid when about ⅓ of the ammonia has been added. After the addition of ammonia is complete the temperature is adjusted to about 75° C. and air blown through the charge at a moderate rate until the excess ammonia has been blown out.

320 parts of phosphorus oxychloride is added to the reaction mixture at 75° C., the rate being maintained so that with slight external cooling the temperature does not exceed about 80° C.

After all the phosphorus oxychloride has been added the mixture is stirred for a short while and then drowned in 1000 parts of ice and 500 parts of water, vigorous stirring being maintained during the drowning. A slurry of phthalonitrile results which is then acidified with 5 normal sulfuric acid. The filter cake is then washed with 1000 parts of water and reslurried in 550 parts of a 2% sodium hydroxide solution. The alkaline slurry is then stirred until homogeneous, filtered, the cake washed alkali free and then dried at 60–65° C. A good yield of phthalonitrile results, the product having a melting point of 137–139° C. The pyridine used in the process is recovered from the filtrate by the usual means of neutralization and separation.

*Example 2*

296 parts of phthalic anhydride is dissolved in 3000 parts of dimethylaniline. 75 parts of anhydrous ammonia is then introduced at a rate such that the temperature rises to about 64° C. Ammonium phthalamate precipitates out of solution. After the addition of ammonia is complete the temperature is raised to 75° C. and air blown through until excess ammonia has been removed.

640 parts of phosphorus oxychloride is then added at a rate such that the temperature is maintained at 75–80° C. with slight external cooling. After the addition is complete the mixture is stirred for a short time at the same temperature and then drowned in 10,000 parts of ice and 5000 parts of water with vigorous stirring. The phthalonitrile slurry resulting is acidified with sulfuric acid and filtered, the cake washed acid free and then slurried in 2500 parts of a 2% sodium hydroxide solution. The alkaline slurry is stirred until uniform, filtered, and the cake washed alkali free and dried at 60–65° C. A good yield is obtained of phthalonitrile of excellent purity.

*Example 3*

193 parts of 3-nitrophthalic anhydride are dissolved in 750 parts of pyridine in a closed vessel. 35 parts of anhydrous ammonia is then introduced into the solution at such a rate that a positive pressure is maintained after the air is displaced. During the introduction the temperature of the mixture rises to about 75° C. and ammonium 3-nitro-phthalamate precipitates out of solution. After the addition of ammonia is complete air is passed through the charge at the same temperature until excess ammonia is blown out.

320 parts of phosphorus oxychloride are then added to the slurry at 75° C., the rate of addition being such that a temperature of 75–80° C. is maintained by slight external cooling. When all of the phosphorus oxychloride has been added the mixture is stirred for a short time and then drowned in 2000 parts of ice and 1000 parts of water with vigorous stirring. The nitro phthalonitrile slurry which results is acidified with sulfuric acid and filtered. The cake is then washed acid free and reslurried in 2000 parts of a 2% sodium hydroxide solution. The alkaline slurry is stirred for a short time, filtered, the cake washed alkali free and dried at 60–65° C. A good yield of the 3-nitro-phthalonitrile results, the product having a melting point of 142–143° C. after a single recrystallization from alcohol.

*Example 4*

162 parts of 3,6-dichlorophthalic anhydride is added to 150 parts of pyridine. Anhydrous ammonia gas is then slowly bubbled into the mixture, the temperature rising to 75° C. After the addition of ammonia is complete and all of the dichlorophthalic anhydride is transformed into the corresponding ammonium phthalamate, the excess ammonia is removed by blowing air through the charge.

300 parts of phosphorus oxychloride is added to the reaction mixture at a rate such that the temperature is maintained at 75–80° C. with slight external cooling. When all of the phosphorus oxychloride is added the mixture is stirred for a short time at the same temperature and then drowned in 2000 parts of ice and 1000 parts of water with vigorous stirring. The resulting slurry is then acidified with sulfuric acid and filtered; the cake is then washed acid free and reslurried in 2000 parts of a 2% sodium hydroxide solution, which is then filtered, the cake washed alkali free and dried at 60-65° C. A good yield of 3,6-dichlorophthalonitrile results, the product melting at 168° C. after purification.

*Example 5*

286 parts of tetrachlorophthalic anhydride is added to 2000 parts of pyridine, and anhydrous ammonia gas passed into the mixture until the reaction is complete. The temperature is then brought up to 75° C. and air blown through to remove excess ammonia.

320 parts of phosphorus oxychloride is then added to the slurry at 75° C., the rate of addition being such that the temperature is maintained at 75-80° C. with slight external cooling. After all of the phosphorus oxychloride is added the mixture is stirred for a short time and then drowned in 2000 parts of ice and 1000 parts of water with vigorous stirring. The resulting slurry is acidified with sulfuric acid and filtered, the cake washed acid free and reslurried in 1000 parts of 2% sodium hydroxide. The alkaline slurry is filtered, and the cake washed alkali free and dried at 60-65° C. A good yield of tetrachlorophthalonitrile results, the product melting at 243.5-244° C. after purification.

*Example 6*

27.8 parts of anthraquinone 2,3-dicarboxylic acid anhydride was dissolved in 125 parts of pyridine. 3.5 parts of anhydrous ammonia gas was introduced into the mixture at such a rate that a positive pressure was maintained after the air had been displaced. The temperature of the mixture rose to 85° C. during the addition.

When the ammonia addition was complete, the temperature was adjusted to 75° C. and air was passed into the charge at a moderate rate for 15 minutes. 32.0 parts of phosphorous oxychloride was then added at such a rate that the temperature was maintained at 75-80° C. with slight external cooling. The addition required 45 minutes.

After the phosphorous oxychloride addition, the mixture was stirred for 5 minutes at 75-80° C. and drowned into 100 parts of ice and 50 parts of water with vigorous stirring. The aqueous slurry of 2,3-dicyanoanthraquinone which resulted was acidified and filtered. The cake was washed with water and reslurried in 2% sodium hydroxide. The alkaline slurry was stirred for 15 minutes, filtered and the cake washed alkali-free and dried at 60-65° C. The 2,3-dicyano anthraquinone so prepared had a slight yellow color and did not melt up to 340° C.

We claim:

1. In the manufacture of aromatic ortho dinitriles from aromatic ortho dicarboxylic acid anhydrides, the improved processes which comprise converting the aromatic ortho dicarboxylic acid anhydride into the ammonium salt of its mono-amide by reacting the said anhydride with at least two equivalents of anhydrous ammonia in the presence of a liquid tertiary nitrogen base to form said ammonium salt of the mono-amide in situ in an anhydrous liquid reaction medium and then converting the said ammonium salt of the mono-amide into the corresponding aromatic ortho dinitrile in situ in the anhydrous liquid reaction medium by reacting said ammonium salt of the mono-amide with phosphorus oxychloride in the anhydrous reaction medium containing the said liquid tertiary nitrogen base, both reactions being effected in the presence of said liquid tertiary nitrogen base and in situ in anhydrous liquid reaction media without isolating said intermediate ammonium salt of the mono-amide.

2. The process of claim 1 wherein said aromatic ortho dicarboxylic anhydride is phthalic anhydride.

3. The process of claim 1 wherein said aromatic ortho dicarboxylic anhydride is tetrachlorophthalic anhydride.

4. The process of claim 1 wherein said aromatic ortho dicarboxylic anhydride is 3-nitro phthalic anhydride.

5. The process of claim 1 wherein said liquid tertiary nitrogen base is pyridine.

6. The process of claim 1 wherein said liquid tertiary nitrogen base is dimethylaniline.

7. The process of claim 1 wherein the aromatic ortho dinitrile so obtained is recovered from the reaction mixture containing the same by drowning said reaction in water to produce an aqueous slurry of the aromatic ortho dinitrile, acidifying the aqueous slurry and filtering the acidified aqueous slurry to separate the aromatic ortho dinitrile.

8. The process of claim 1 wherein the excess of ammonia is removed from the said reaction mixture containing the tertiary nitrogen base and said ammonium salt of the mono-amide by blowing the said reaction mixture with air, prior to the conversion of said ammonium salt of the mono-amide into the corresponding aromatic ortho dinitrile.

9. The process of claim 1 wherein said aromatic ortho dicarboxylic acid anhydride is a chlorophthalic anhydride.

10. The process of claim 1 wherein said aromatic ortho dicarboxylic anhydride is a nitrophthalic anhydride.

11. The process of claim 1 wherein said liquid tertiary nitrogen base is a liquid tertiary nitrogen heterocyclic base.

12. The process of claim 1 wherein said liquid tertiary nitrogen base is a liquid N-dialkyl aromatic amine of the benzene series.

MARIO SCALERA.
ROBERT E. BROUILLARD.

REFERENCES CITED

The following references are of record in the file of this patent:

UNITED STATES PATENTS

| Number | Name | Date |
|---|---|---|
| 1,695,372 | Flemming et al. | Dec. 18, 1928 |
| 1,728,216 | Schirmacher et al. | Sep. 17, 1929 |
| 1,876,652 | Fischl et al. | Sep. 13, 1932 |
| 1,938,029 | Kugel | Dec. 5, 1933 |
| 1,991,787 | Carleton | Feb. 19, 1935 |
| 2,275,006 | Bindler | Mar. 3, 1942 |
| 2,387,435 | Fleysher | Oct. 23, 1945 |

FOREIGN PATENTS

| Number | Country | Date |
|---|---|---|
| 487,877 | Great Britain | June 28, 1938 |

OTHER REFERENCES

Marignac, Beilstein, (Handbuch der Org. Chem.) vol. 9, p. 809 (1926).

Dominikiewicz. Chemical Abstracts, vol. 32, col. 2916-2917 (1938).